(12) United States Patent
Tanahashi et al.

(10) Patent No.: US 8,926,262 B2
(45) Date of Patent: Jan. 6, 2015

(54) CMC TURBINE STATOR BLADE

(75) Inventors: Yosuke Tanahashi, Tokyo (JP); Akira Takahashi, Tokyo (JP); Hiroyuki Yagi, Tokyo (JP)

(73) Assignee: IHI Corporation, Tokyo (JP)

( * ) Notice: Subject to any disclaimer, the term of this patent is extended or adjusted under 35 U.S.C. 154(b) by 598 days.

(21) Appl. No.: 13/259,263

(22) PCT Filed: Mar. 24, 2010

(86) PCT No.: PCT/JP2010/055104
§ 371 (c)(1),
(2), (4) Date: Sep. 23, 2011

(87) PCT Pub. No.: WO2010/110327
PCT Pub. Date: Sep. 30, 2010

(65) Prior Publication Data
US 2012/0009071 A1  Jan. 12, 2012

(30) Foreign Application Priority Data
Mar. 26, 2009  (JP) ................. 2009-075962

(51) Int. Cl.
| *F01D 9/04* | (2006.01) |
| *F01D 5/28* | (2006.01) |
| *F01D 11/00* | (2006.01) |
| *F16J 15/06* | (2006.01) |

(52) U.S. Cl.
CPC ............. *F01D 5/282* (2013.01); *F01D 5/284* (2013.01); *F01D 9/042* (2013.01); *F01D 11/005* (2013.01); *F16J 15/062* (2013.01); *Y02T 50/672* (2013.01); *F05D 2300/603* (2013.01)
USPC .......... 415/9; 415/200; 415/209.4; 415/210.1; 416/241 B

(58) Field of Classification Search
CPC .......... F01D 5/282; F01D 5/284; F01D 9/042; F01D 11/005; F05D 2300/6033; Y02T 50/672; F16J 15/062

USPC ......... 415/9, 200, 209.3, 209.4, 210.1, 211.2, 415/213.1, 215.1; 416/241 B
See application file for complete search history.

(56) References Cited

U.S. PATENT DOCUMENTS

| 4,820,124 A * | 4/1989 | Fried ............................ 416/191 |
| 5,332,360 A | 7/1994 | Correia et al. |

(Continued)

FOREIGN PATENT DOCUMENTS

| EP | 1 852 572 A2 | 11/2007 |
| JP | 7-150905 | 6/1995 |

(Continued)

OTHER PUBLICATIONS

International Search Report issued in related application PCT/JP2010/055102, completed Jun. 7, 2010 and mailed Jun. 22, 2010.

(Continued)

*Primary Examiner* — Edward Look
*Assistant Examiner* — Juan G Flores
(74) *Attorney, Agent, or Firm* — Griffin & Szipl, P.C.

(57) ABSTRACT

A CMC turbine stator blade 1 includes a blade 2 of a ceramic matrix composite material formed or a metallic material, and a band 5 formed of a ceramic matrix composite material and supporting the blade 2. The blade 2 includes a first fitting portion 3 to which the band 5 is fitted outside. The band 5 includes a second fitting portion 7 to which the first fitting portion 3 is fitted inside. A flexible wire 8 is disposed between the fitting portions 3, 7 to fix the blade 2 and the band 5. A first groove 3a in the outer peripheral surface of the first fitting portion 3 extends in the front-to-rear direction of the blade 2. A second groove 7a in the inner peripheral surface of the second fitting portion 7a extends along the first groove 3a. The wire 8 is disposed between the grooves 3a, 7a.

2 Claims, 5 Drawing Sheets

(56) References Cited

U.S. PATENT DOCUMENTS

| | | |
|---|---|---|
| 6,648,597 B1 * | 11/2003 | Widrig et al. ............ 415/200 |
| 7,452,189 B2 | 11/2008 | Shi et al. |
| 8,257,038 B2 | 9/2012 | James |
| 2004/0096323 A1 | 5/2004 | Hagle et al. |
| 2007/0258811 A1 | 11/2007 | Shi et al. |

FOREIGN PATENT DOCUMENTS

| | | |
|---|---|---|
| JP | 10-205305 A | 8/1998 |
| JP | 2007-255224 | 10/2007 |
| JP | 2007-298024 A | 11/2007 |

OTHER PUBLICATIONS

International Search Report issued in corresponding application PCT/JP2010/055104, completed Jun. 7, 2010 and mailed Jun. 22, 2010.

Office Action issued in corresponding Canadian application 2,752,426 on Apr. 3, 2013.

Office Action issued in co-pending related U.S. Appl. No. 13/259,346 on Apr. 24, 2014.

* cited by examiner

CMC TURBINE STATOR BLADE

This is a National Phase Application in the United States of International Patent Application No. PCT/JP2010/055104 filed Mar. 24, 2010, which claims priority on Japanese Patent Application No. 2009-075962, filed Mar. 26, 2009. The entire disclosures of the above patent applications are hereby incorporated by reference.

TECHNICAL FIELD

The present invention relates to a turbine blade that is formed of a ceramic matrix composite material (CMC), and particularly, to a CMC turbine stator blade in which a blade and a band are fastened (bonded) to each other with a simple structure.

BACKGROUND ART

A turbine stator blade is a component arranged in a flow path of a combustion gas from a combustor in a gas turbine engine. FIG. 1 illustrates an example of an existing turbine blade 30. The turbine blade 30 includes a plurality of blades 31 which are disposed about the axis of the turbine at intervals in the circumferential direction, and bands 32 which support both ends of each blade 31 and extend in the circumferential direction.

Since the surface of the turbine stator blade 30 is exposed to a hot combustion gas (mainstream gas) 34 discharged from a combustor, the surface of the turbine blade needs to be prevented from being damaged by the heat. For this reason, the inside of the blade is cooled by cooling air, and film cooling is performed to cool the surfaces of the blade and the band such that cooling air is blown from cooling holes provided in the blade and the band to form a layer of the cooling air. Since the turbine stator blade has a complex structure to perform such film cooling, manufacturing costs become high. Further, since a part of high-pressure air contributing to the thrust force is used as cooling air, there is a loss in the thrust force.

On the other hand, in an airplane engine, since the output and efficiency of the turbine may improve by increasing the temperature of a combustion gas, an increase in the temperature of the combustion gas is important for high performance of the airplane engine. Further, there is a need to decrease the weight of the components for high performance of the airplane engine. For this reason, a study has been conducted which attempts to use a ceramic matrix composite material (CMC: Ceramic Matrix Composites) as a material for forming the turbine stator blade. The CMC has a benefit in that the heat resistance is superior to that of the metallic material, and the specific gravity is smaller than that of the metallic material.

The CMC is a composite material of fiber fabric and ceramic, and in order to maintain the strength, the fiber fabric needs to be disposed in the smaller parts of components. The blade with the film cooling structure has a complex structure. Further, in the blade and the band, the constitution direction of the fiber fabric are different in accordance with the requirements of function and strength. For this reason, it is difficult to integrally form the portions of the blade and the band from the fiber fabric using the current technique. For this reason, a technique is adopted which separately manufactures the blade and the band and fastens both to each other to form a turbine stator blade.

However, since the strength of the CMC is smaller than that of metal, there is a need to prepare a countermeasure for alleviating a concentration of stress in the bonded portion in the case where the components formed of CMC are bonded to each other. Further, in the case where a gap is formed in the fastened portion, the mainstream gas may leak from the gap. For this reason, there is a need to prepare a countermeasure for reducing the leakage.

Incidentally, Patent Document 1 below discloses a background art in which a blade and a band are separately manufactured, and both are fastened to each other to form a turbine blade.

FIGS. 2A and 2B are cross-sectional views illustrating a turbine blade 40 disclosed in Patent Document 1. In FIGS. 2A and 2B, a blade 41 and a band (a platform) 42 are separately manufactured components, and both are bonded to each other to form the turbine blade 40. In FIG. 2A, the blade 41 and the band 42 are fastened to each other by mechanical fastening means (a bolt, a clamp, a pin, or the like) 43 penetrating both. In FIG. 2B, the blade 41 and the band 42 are fastened to each other by a reinforcement member 44 with a U-shaped cross-section.

PRIOR ART DOCUMENT

Patent Document

[Patent Document 1] U.S. Pat. No. 6,648,597

SUMMARY OF THE INVENTION

Problems to be Solved by the Invention

However, in the fastening structure shown in FIG. 2A, since both the blade 41 and the band 42 are fastened to each other by the mechanical fastening means 43 penetrating both, the mechanical fastening means 43 needs to be attached to a plurality of positions in order to properly fix both, and the fastening work becomes difficult in the case where the blade 41 is small in size. For this reason, there is a problem in that the assembling workability is poor.

Further, even in the fastening structure shown in FIG. 2B, the reinforcement member 44 needs to be attached to a plurality of positions in order to properly fix the blade and the band. For this reason, there is a problem in that the assembling workability is poor. Further, there is a problem in that a stress concentrates on a portion to which the mechanical fastening means is attached.

The present invention was made in view of the above-described problems, and it is an object of the present invention to provide a CMC turbine stator blade capable of reducing a concentration of stress in a bonded portion between the blade and the band, reducing a leakage of a gas between the blade and the band, and simply fastening the blade and the band to each other during assembly.

Means for Solving the Problems

In order to solve the above-described problems, the CMC turbine stator blade of the present invention adopts the following technical means.

According to the present invention, there is provided a CMC turbine stator blade comprising: a blade which is formed of a ceramic matrix composite material; and a band which is formed of a ceramic matrix composite material or a metallic material, and supports the blade, wherein the blade and the band are bonded to each other, the blade includes a first fitting portion to which the band is fitted at an outside thereof, the band includes a second fitting portion to which the first fitting portion is fitted at an inside thereof, a flexible wire is disposed between the first fitting portion and the second fitting portion so as to fix the blade and the band to each other, and a first groove is formed in the outer peripheral surface of the first fitting portion to extend in a front-to-rear direction of the blade, a second groove is formed in the inner peripheral surface of the second fitting portion to extend along the first groove, and the wire is disposed between the first groove and the second groove.

According to the configuration of the present invention, the flexible wire is disposed between the first groove formed in the first fitting portion of the blade and the second groove formed in the second fitting portion of the band so that the blade and the band can be fixed. Accordingly, the blade and the band are fixed by the wire.

For this reason, the blade and the band are not physically integrated with each other, but only the relative movement thereof is restrained by the wire. Thereby, a concentration of stress at the fastened portion between the blade and the band may be reduced. Further, since the wire is flexible, the wire fits for the shapes of the blade and the band, and has a role of gas sealing as well as the fixing. Furthermore, since the blade and the band are fixed by inserting the wire between the first fitting portion of the blade and the second fitting portion of the band during assembly, both may be fastened to each other with a simple work even in the case where the blade is small in size.

Further, in the CMC turbine stator blade, the first groove is formed in the outer peripheral surface of the first fitting portion at the belly and back sides of the blade, and the second groove is formed in the inner peripheral surface of the second fitting portion at the belly and back sides of the blade.

According to the above-described configuration, since the blade and the band are fixed by the wire at both the belly and back sides of the blade, the fastening force can be made large.

Further, in the CMC turbine stator blade, a first cutout portion is formed at a front edge part of the second fitting portion, a second cutout portion is formed at the rear edge part of the second fitting portion, and both ends of the wire protrude from one of the first cutout portion and the second cutout portion, and an intermidiate portion of the wire is folded back at the other of the first cutout portion and the second cutout portion.

According to the above-described configuration, the wire is inserted between the first groove and the second groove such that one end of the wire is inserted between the first groove and the second groove at the belly side or the back side from one cutout portion (for example, the first cutout portion), is then taken out from the other cutout portion (for example, the second cutout portion), and is folded back at that position. Next, one end of the wire is inserted between the first groove and the second groove at the opposite side, and is then taken out from one cutout portion. Therefore, the wire may be simply disposed. Further, since the intermediate portion of the wire is folded back, the blade and the band may be fixed by one wire.

Further, in the CMC turbine stator blade, end parts of the first fitting portion and the second fitting portion are adhered to each other.

According to the above-described configuration, by such adhering, it is possible to reinforce the fixing of the blade and the band.

Advantage of the Invention

According to the CMC turbine stator blade of the present invention, it is possible to reduce a concentration of stress in the bonded portion between the blade and the band, reduce the leakage of a gas between the blade and the band, and simply fasten the blade and the band to each other during assembly.

EMBODIMENTS THE INVENTION

Figure 1:
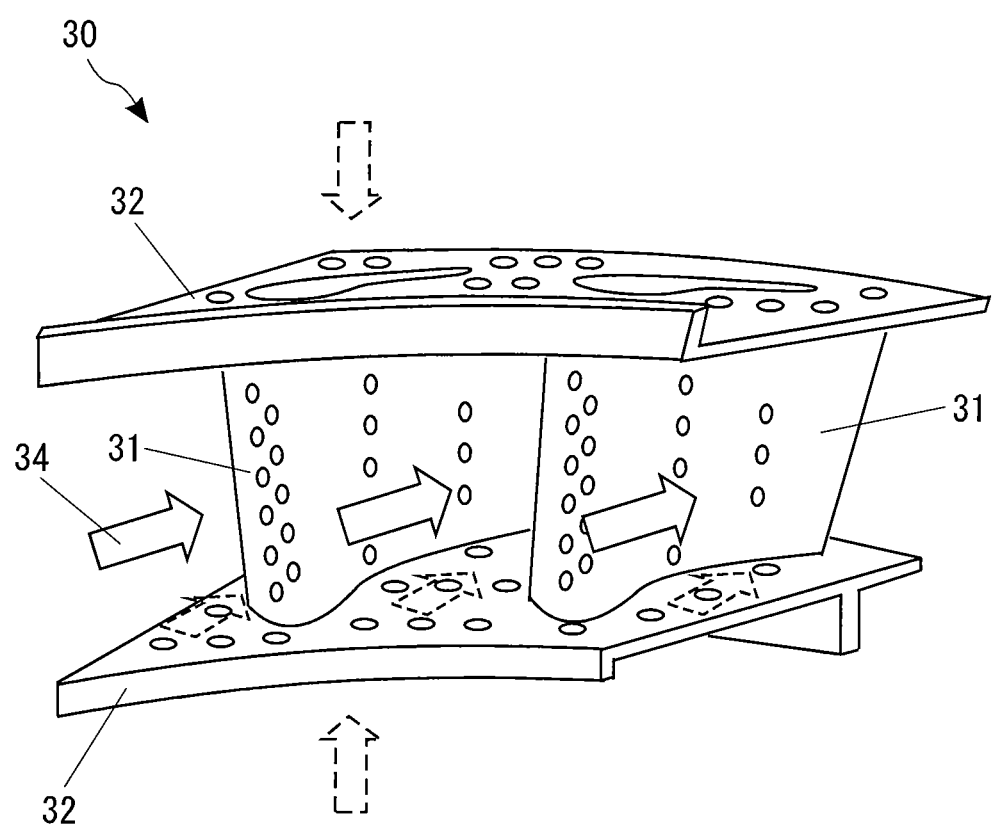
FIG. 1 is a diagram illustrating an example of an existing turbine stator blade.
Figure 2A:
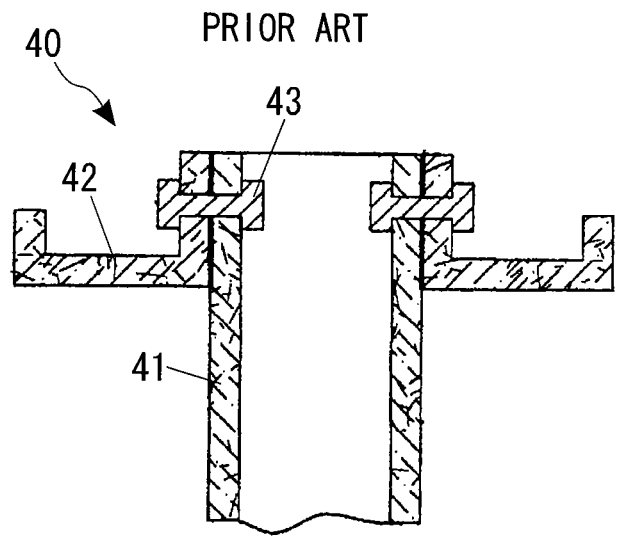
FIG. 2A is a diagram illustrating the structure of a turbine blade disclosed in Patent Document 1.
Figure 2B:
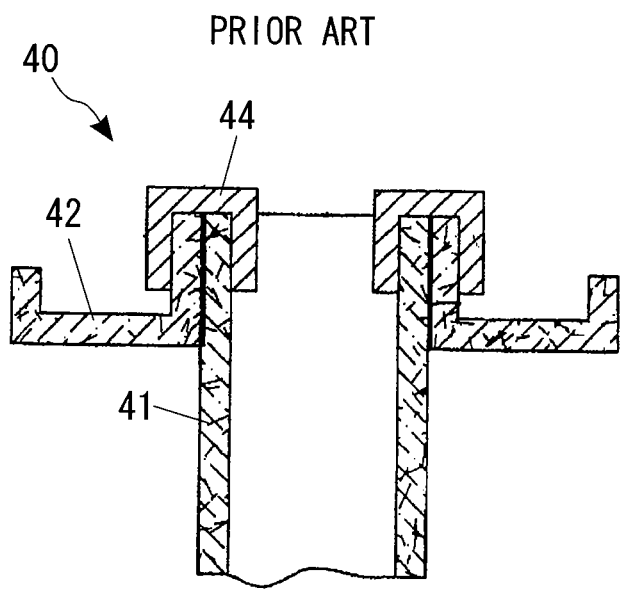
FIG. 2B is a diagram illustrating another structure of the turbine blade disclosed in Patent Document 1.

Hereinafter, exemplary embodiments of the present invention will be described by referring to the accompanying drawings. Furthermore, the same reference numerals will be given to the same or common components of the drawings, and the repetitive description will be omitted.

Figure 3:
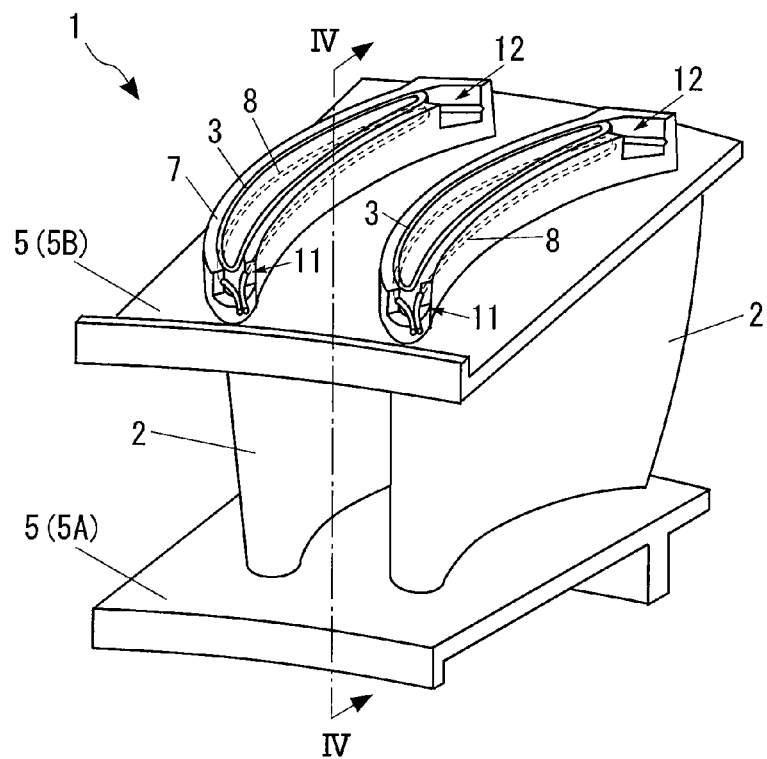
FIG. 3 is a schematic perspective view illustrating a first embodiment of a turbine stator blade according to the present invention.

FIG. 3 is a diagram illustrating a first embodiment of a turbine stator blade 1 according to the present invention, and is a schematic perspective view when the turbine stator blade 1 is seen from the upstream side of the flow direction of the mainstream gas.

In the description below, the "radial direction" indicates the radial direction of the turbine.

In FIG. 3, the CMC turbine stator blade 1 includes a plurality of blades 2 which are disposed at intervals in the circumferential direction about the axis of the turbine, and bands 5 which support both ends of each blade 2 and extend in the circumferential direction. In the specification, the band 5 located at the inner side (the lower side of FIG. 3) of the radial direction is defined as a first band 5A, and the band 5 located at the outer side (the upper side of FIG. 3) of the radial direction is defined as a second band 5B. However, hereinafter, both the first band 5A and the second band 5B are generally referred to as the band 5 except for cases where they need to be separately referred to for description.

The blade 2 is formed of a ceramic matrix composite material (CMC), the band 5 is formed of a CMC or a metallic material, both are separately manufactured components, and the turbine stator blade 1 is formed by fastening both to each other. In the CMC process of manufacturing the blade 2 and the band 5, known techniques such as PIP (polymer immersion pyrolysis) or CVI (chemical vapor infiltration) may be used. The reinforcement fiber in the CMC may be a ceramic material, and for example, silicon carbide may be used as the reinforcement fiber.

The CMC turbine stator blade 1 shown in FIG. 3 forms one segment by disposing two blades 2 between the first band 5A and the second band 5B, and in the stator blade unit of the gas turbine, these segments are arranged over 360° about the axis of the turbine. However, the present invention is not limited to the configuration of FIG. 3, and a configuration may be adopted in which one or three or more blades 2 are disposed in one segment.

Since the surface of the CMC turbine stator blade 1 is exposed to a hot combustion gas (mainstream gas) discharged from a combustor, the surface of the turbine blade needs to be prevented from being damaged by the heat. For this reason, the inside of the blade 2 is cooled by cooling air, and film cooling is performed to cool the surfaces of the blade 2 and the band 5 such that cooling air is blown from cooling holes provided in the blade 2 and the band 5 to form a layer of the cooling air. Thereby, the surfaces of the blade 2 and the band 5 are cooled. The cooling hole for film cooling is not shown in FIG. 3 for simplicity of the drawing.

Figure 4:
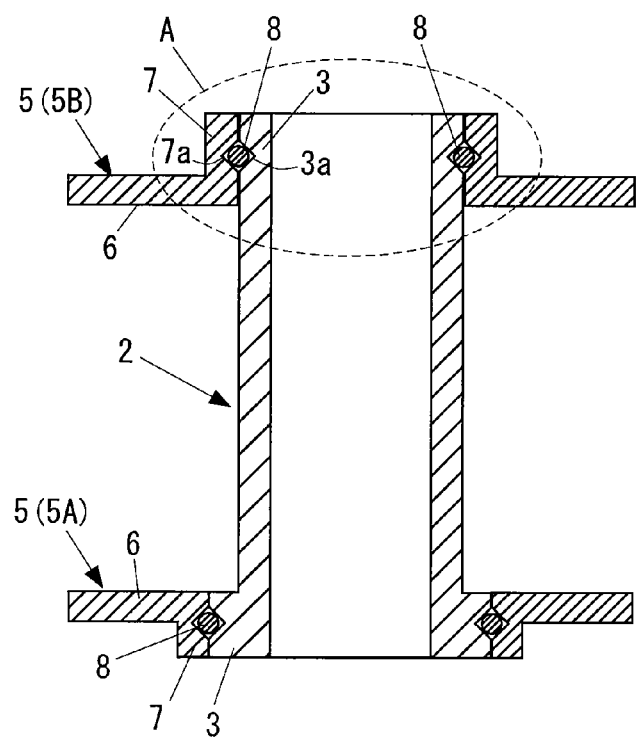
FIG. 4 is a cross-sectional view taken along the line IV-IV of FIG. 3.

FIG. 4 is a cross-sectional view taken along the line IV-IV of FIG. 3. As shown in FIGS. 3 and 4, the blade 2 includes a first fitting portion 3 to which the band 5 is fitted at the outside thereof, and the band 5 includes a second fitting portion 7 to which the first fitting portion 3 is fitted at the inside thereof.

The first fitting portion 3 is formed at both end parts of the blade 2. The second fitting portion 7 is a portion which protrudes in the radial direction along the first fitting portion 3. Specifically, the second fitting portion 7 of the first band 5A protrudes inward in the radial direction from a base 6 extending in the circumferential direction, and the second fitting portion 7 of the second band 5B protrudes outward in the radial direction from the base 6 extending in the circumferential direction. In the blade 2 and the band 5 with such a configuration, the blade 2 and the band 5 are fitted to each other such that the outer periphery of the first fitting portion 3 is fitted to the inner periphery of the second fitting portion 7.

The CMC turbine stator blade 1 of the present invention includes a flexible wire 8 which is disposed between the first fitting portion 3 and the second fitting portion 7 to fix the blade 2 and the band 5. The flexible wire 8 may be formed of, for example, metal. The flexible wire 8 may be formed of a refractory metal such as INCONEL (trademark), WASPALOY (trademark), or UDIMET (trademark).

Figure 5:
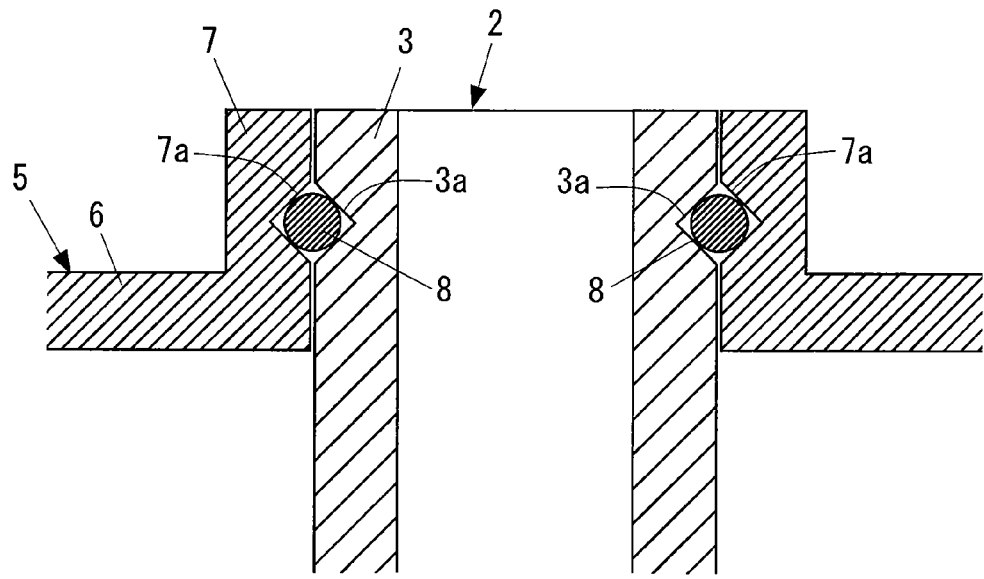
FIG. 5 is an enlarged view of the part A of FIG. 4.

FIG. 5 is an enlaeged view of the part A of FIG. 4. As shown in FIG. 5, a first groove 3a is formed in the outer peripheral surface of the first fitting portion 3 to extend in the front-to-rear direction of the blade 2, a second groove 7a is formed in the inner peripheral surface of the second fitting portion 7 to extend along the first groove 3a, and the wire 8 is disposed between the first groove 3a and the second groove 7a.

The first groove 3a and the second groove 7a may be respectively formed in the first fitting portion 3 and the second fitting portion 7 by, for example, machining. Alternatively, the first groove 3a and the second groove 7a may be formed without machining by preparing the fiber fabric to have a shape of the first groove 3a and the second groove 7a.

In the first embodiment, the first groove 3a is formed in the outer peripheral surface of the first fitting portion 3 at the belly and back sides of the blade 2, and the second groove 7a is formed in the inner peripheral surface of the second fitting portion 7 at the belly and back sides of the blade 2.

The first groove 3a and the second groove 7a may be formed only at one of the belly and back sides of the blade 2, but as in the embodiment, it is desirable that they be formed at both the belly and back sides of the blade 2.

Further, as shown in FIG. 3, in the embodiment, a first cutout portion 11 is formed at the front edge part of the second fitting portion 7, so that the front edge part of the first fitting portion 3 is exposed. Further, a second cutout portion 12 is formed at the rear edge part of the second fitting portion 7, so that the rear edge part of the first fitting portion 3 is exposed.

Further, both ends of the wire 8 protrude from one (in the example of the drawing, the first cutout portion 11) of the first cutout portion 11 and the second cutout portion 12, and the intermidiate portion of the wire 8 is folded back at the other (in the example of the drawing, the second cutout portion 12) of the first cutout portion 11 and the second cutout portion 12.

Further, in the embodiment, both ends of the wire 8 protruding from the first cutout portion 11 are adhered to each other by an adhesive or the like. Furthermore, both ends of the wire 8 may be bonded to each other by means other than adhering. Further, instead of bonding both ends of the wire 8 to each other, both ends of the wire 8 may be bonded to another portion (for example, the outer surface of the second fitting portion 7 and the like).

Next, the sequence of assembling the CMC turbine stator blade 1 with the above-described configuration will be described by referring to FIGS. 3 to 5.

First, the blade 2, the first band 5A, and the second band 5B formed of CMC are prepared. The first fitting portion 3 at the inner side of the radial direction of the blade 2 is fitted into the second fitting portion 7 of the first band 5A, and the first fitting portion 3 at the outer side of the radial direction of the blade 2 is fitted into the second fitting portion 7 of the second band 5B. At this time, the relative position between the blade 2 and the band 5 is adjusted so that the first groove 3a of the first fitting portion 3 and the second groove 7a of the second fitting portion 7 can be aligned with each other at the positions on the inner side and the outer side of the radial direction.

Subsequently, one end of the wire 8 is inserted between the first groove 3a and the second groove 7a at the belly side or the back side from one cutout portion (in the example of the drawing, the first cutout portion 11), is then taken out from the other cutout portion (in the example of the drawing, the second cutout portion 12), is folded back at that position, and further is inserted between the first groove 3a and the second groove 7a at the opposite side (the back side in the case where one end of the wire has been inserted at the belly side, or the belly side in the case where one end of the wire has been inserted at the back side). Next, one end of the wire 8 is taken out from one cutout portion (in the example of the drawing, the first cutout portion 11). Accordingly, the wire 8 is inserted between the first groove 3a and the second groove 7a throughout the entire length thereof, and the blade 2 and the band 5 are fastened to each other by the wire 8.

According to the above-described embodiment of the present invention, the flexible wire 8 is disposed between the first groove 3a formed in the first fitting portion 3 of the blade 2 and the second groove 7a formed in the second fitting portion 7 of the band 5 so that the blade 2 and the band 5 can be fixed. Accordingly, the blade 2 and the band 5 are fixed by the wire 8. For this reason, the blade 2 and the band 5 are not physically integrated with each other, but only the relative movement thereof is restrained by the wire 8. Thereby, a concentration of stress at the fastened portion between the blade 2 and the band 5 may be reduced. Further, since the wire 8 is flexible, the wire fits for the shapes of the blade 2 and the band 5, and has a role of gas sealing as well as fixing. Furthermore, since the blade 2 and the band 5 are fixed by inserting the wire 8 between the first fitting portion 3 of the blade 2 and the second fitting portion 7 of the band 5 during assembly, both can be fastened to each other with a simple work even in the case where the blade 2 is small in size.

Further, as in the configuration examples of FIGS. 3 to 5, since the blade 2 and the band 5 are fixed by the wire 8 at both the belly and back sides of the blade 2, the fastening force can be made large.

Further, as in the configuration example of FIG. 3, when the first cutout portion 11 and the second cutout portion 12 are formed in the second fitting portion 7, the wire 8 may be easily inserted and disposed between the first groove 3a and the second groove 7a. Further, since the intermidiate portion of the wire 8 is folded back, the blade 2 and the band 5 may be fixed using one wire 8.

Furthermore, in the description above, one wire 8 is used at the belly and back sides of the blade 2 by folding back the intermidiate portion of the wire 8. However, instead of this configuration, different wires 8 may be used at the belly and back sides of the blade 2. In this case, the ends of each wire 8 taken out from the cutout portions may be bonded to each other by adhering at each position of the first cutout portion 11 and the second cutout portion 12, or the end of each wire 8 may be bonded to another portion (for example, the outer surface of the second fitting portion 7 and the like).

Further, in the description above, the cutout portions (the first cutout portion 11 and the second cutout portion 12) are respectively formed at both the front and rear sides of the second fitting portion 7, but one cutout portion may be omitted. In this case, since it is difficult to fold back the wire 8 at the side opposite to the side where the wire 8 is first inserted, separate wires 8 may be inserted into the front and rear sides.

Figure 6:
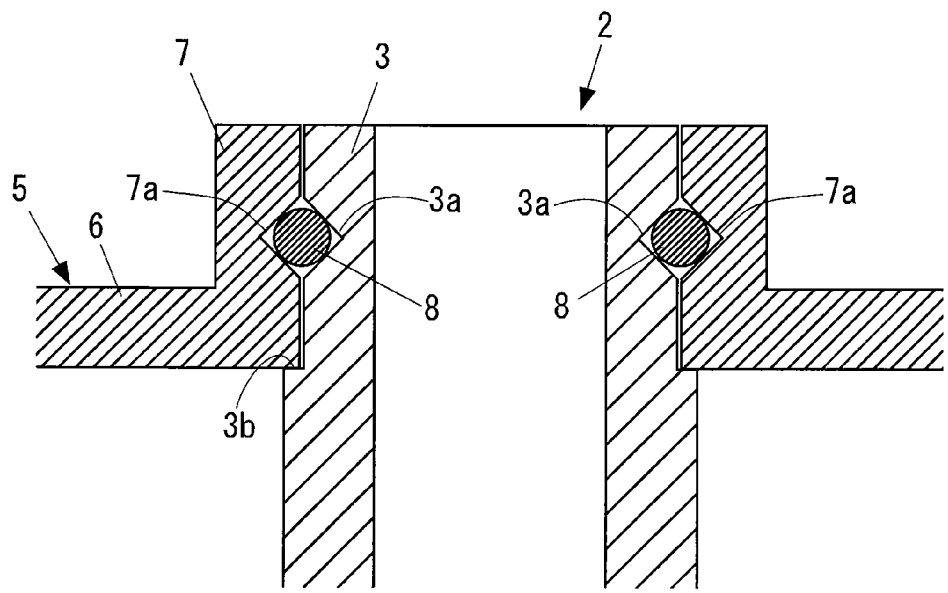
FIG. 6 is a cross-sectional view illustrating a first modified example of the embodiment of the turbine stator blade according to the present invention.

FIG. 6 is a cross-sectional view illustrating a first modified example of the first embodiment of the turbine stator blade 1 of the present invention. In FIG. 6, a step 3b is provided at the outer peripheral surface of the blade 2 to determine the insertion depth of the first fitting portion 3 such that the first groove 3a and the second groove 7a are positioned to directly face each other when the blade 2 and the band 5 are fitted to each other. Since it is easy to align the first groove 3a and the second groove 7a with each other in the case where the step 3b is provided, the assembly workability may further improve. Furthermore, the other configurations of the modified example are the same as those of the first embodiment shown in FIGS. 3 to 5.

Figure 7:
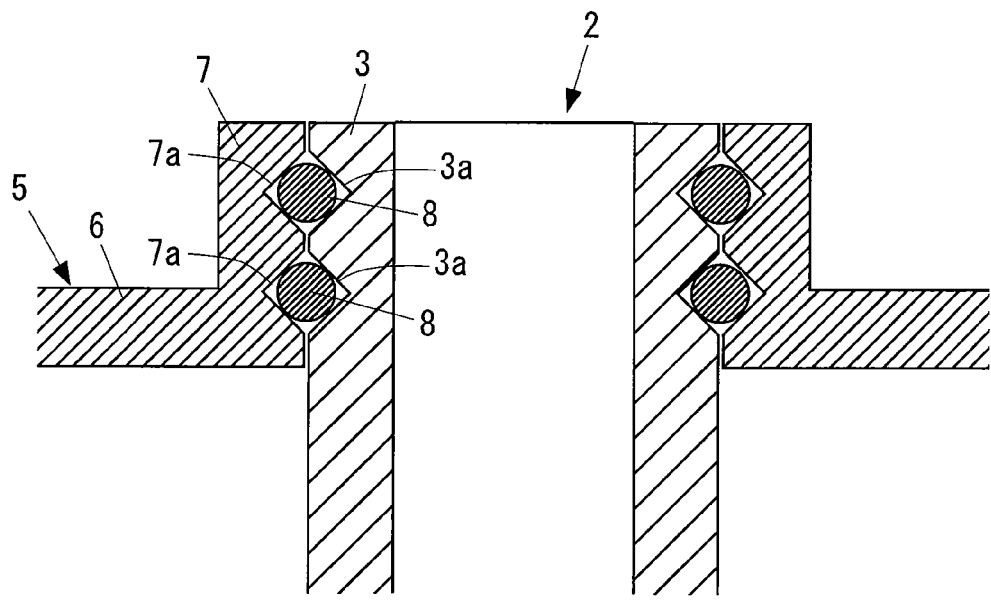
FIG. 7 is a cross-sectional view illustrating a second modified example of the embodiment of the turbine stator blade according to the present invention.

FIG. 7 is a cross-sectional view illustrating a second modified example of the first embodiment of the turbine stator blade 1 of the present invention. In FIG. 7, a plurality of (in the example of the drawing, two) first grooves 3a are formed in the outer peripheral surface of the first fitting portion 3 at intervals in the radial direction. Further, a plurality of (in the example of the drawing, two) second grooves 7a are formed at the inner peripheral surface of the second fitting portion 7 at intervals in the radial direction to be disposed at positions facing the plurality of first grooves 3a. Further, the plurality of wires 8 are inserted and disposed between the plurality of the first grooves 3a and the second grooves 7a. The number of the first grooves 3a and the number of the second grooves 7a in the first fitting portion 3 and the second fitting portion 7 may be three or more, respectively. The other configurations of the second modified example are the same as those of the first embodiment shown in FIGS. 3 to 5.

According to the second modified example with such a configuration, since the blade 2 and the band 5 are fixed by the wires 8 at a plurality of positions in the radial direction, it is possible to more securely fix the blade 2 and the band 5.

Figure 8:
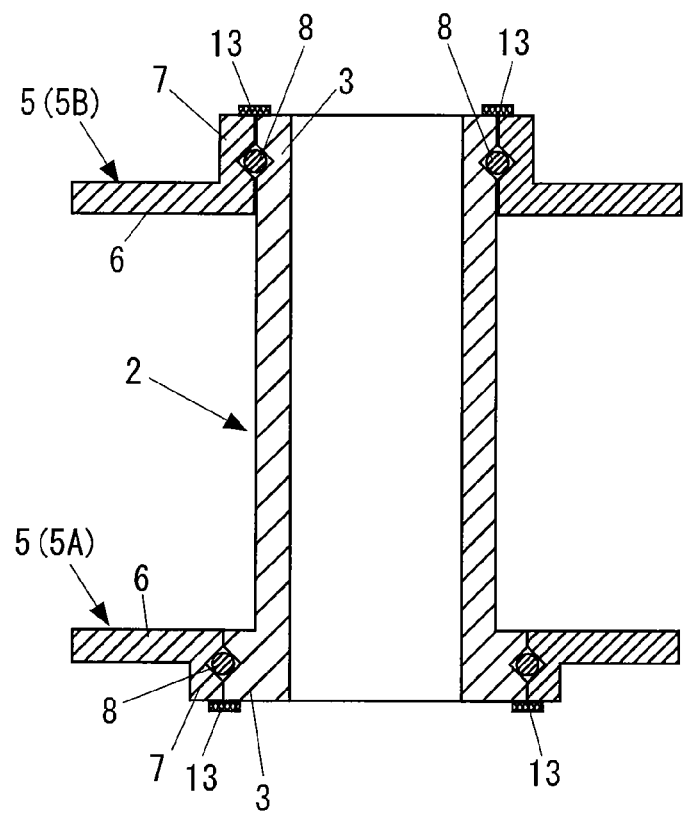
FIG. 8 is a cross-sectional view illustrating a second embodiment of the turbine stator blade according to the present invention.

FIG. 8 is a diagram illustrating a second embodiment of the turbine stator blade 1 of the present invention, and is a cross-sectional view which is the same as that of FIG. 4. In the second embodiment, the end parts of the first fitting portion 3 and the second fitting portion 7 are adhered to each other by the adhering member 13. The adhering member 13 needs to withstand the temperature (for example, 400° C. to 500° C. or more) because the adhering member 13 is disposed in an environment at such a temperature. For example, the adhering member 13 may be an adhesive or a brazing material that is ceramic bond, alumina, silica, mullite, or the like in a slurry state. Further, the adhering member 13 may be a flexible adhesive which contains felt-like silica wool, ceramic fiber, or the like. The other configurations of the second embodiment are the same as those of the first embodiment shown in FIGS. 3 to 5.

According to the second embodiment with the above-described configuration, since the configuration is similar to that of the first embodiment, it is possible to reduce a concentration of stress in the bonded portion between the blade 2 and the band 5, reduce the leakage of a gas between the blade 2 and the band 5, and simply fasten the blade 2 and the band 5 to each other during assembly.

Further, in the second embodiment, since the adhering member 13 is also used, it is possible to reinforce the fixing between the blade 2 and the band 5, and more securely fasten the blade 2 and the band 5 to each other. Further, by using the flexible adhesive, it is possible to further reduce a concentration of stress.

Furthermore, although the embodiments of the present invention have been described, the above-described embodiments of the present invention are merely examples, and the scope of the present invention is not limited thereto. The scope of the present invention is shown in the claims, and includes all modifications within the concept and the scope equivalent to those of the claims.

DESCRIPTION OF REFERENCE NUMERALS

1: CMC turbine stator blade
2: blade
3: first fitting portion
3a: first groove
3b: step
5: band
5A: first band
5B: second band
6: base
7: second fitting portion
7a: second groove
8: wire
11: first cutout portion
12: second cutout portion
13: adhering member

The invention claimed is:
1. A CMC turbine stator blade comprising:
a blade, formed of a ceramic matrix composite material; and
a band, formed of a ceramic matrix composite material or a metallic material, and supporting the blade,
wherein the blade and the band are bonded to each other,
the blade includes a first fitting portion to which the band is fitted at an outside thereof, and
the band includes a second fitting portion to which the first fitting portion is fitted at an inside thereof; and
a flexible wire disposed between the first fitting portion and the second fitting portion so as to fix the blade and the band to each other,
wherein a first groove is formed in the outer peripheral surface of the first fitting portion to extend in a front-to-rear direction of the blade, a second groove is formed in the inner peripheral surface of the second fitting portion to extend along the first groove, and the wire is disposed between the first groove and the second groove, wherein the first groove s formed the outer peripheral surface of the first fitting portion at the belly and back sides of the blade, wherein the second groove is formed in the inner peripheral surface of the second fitting portion at the belly and back sides of the blade, wherein a first cutout portion is formed at a front edge of the second fitting portion, wherein a second cutout portion is formed at the rear edge part of the second fitting portion, and wherein both ends of the wire protrude from one of the first cutout portion and the second cutout portion, and an intermediate portion of the wire is folded back at the other of the first cutout portion and the second cutout portion.

2. The CMC turbine stator blade according to claim 1, wherein end parts of the first fitting portion and the second fitting portion are adhered to each other.

\* \* \* \* \*